(12) United States Patent
Maida et al.

(10) Patent No.: US 8,105,734 B2
(45) Date of Patent: Jan. 31, 2012

(54) TITANIA-DOPED QUARTZ GLASS MEMBER AND MAKING METHOD

(75) Inventors: Shigeru Maida, Joetsu (JP); Hisatoshi Otsuka, Joetsu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 202 days.

(21) Appl. No.: 12/496,688

(22) Filed: Jul. 2, 2009

(65) Prior Publication Data
US 2010/0003609 A1  Jan. 7, 2010

(30) Foreign Application Priority Data
Jul. 7, 2008 (JP) .................. 2008-177076

(51) Int. Cl.
*G03F 1/00* (2006.01)
*C03B 19/06* (2006.01)
(52) U.S. Cl. ............................. 430/5; 65/17.4
(58) Field of Classification Search .............. 430/5, 311; 501/53, 54; 359/350; 250/504; 65/17.4, 65/397, 413
See application file for complete search history.

(56) References Cited

U.S. PATENT DOCUMENTS

| | | |
|---|---|---|
| 6,855,908 B2 | 2/2005 | Takeuchi et al. |
| 6,990,836 B2 | 1/2006 | Maida et al. |
| 2002/0124791 A1* | 9/2002 | Ito .................... 117/13 |
| 2005/0245382 A1 | 11/2005 | Iwahashi et al. |
| 2005/0245383 A1 | 11/2005 | Iwahashi et al. |
| 2007/0125747 A1 | 6/2007 | Otsuka et al. |
| 2007/0134566 A1* | 6/2007 | Maida et al. ........... 430/5 |
| 2007/0207911 A1 | 9/2007 | Koike et al. |
| 2007/0263281 A1 | 11/2007 | Maxon et al. |

FOREIGN PATENT DOCUMENTS

| | | |
|---|---|---|
| EP | 1 251 108 A1 | 10/2002 |
| JP | 8-31723 | 2/1996 |
| JP | 9-59034 A | 3/1997 |
| JP | 2001-316122 A | 11/2001 |
| JP | 2002-316835 A | 10/2002 |
| JP | 2006-8426 A | 1/2006 |
| JP | 2006-240978 A | 9/2006 |

OTHER PUBLICATIONS

Zurnal Pril; adnoi Spektroskopii, Jun. 1987, vol. 46, No. 6, pp. 987-991.
Khotimchenko et al., "Determining the Content of Hydrogen Dissolved in Quartz Glass Using the Methods of Raman Scattering and Mass Spectrometry", J. Appl. Spectrosc. vol. 46, No. 6, pp. 632-635 (Translated from Zhurnal Prikladnoi Spektroskopii, Jun. 1987, vol. 46, No. 6, pp. 987-991).
European Search Report issued in corresponding European Application No. EP 09 25 1646.7 dated Oct. 5, 2009.

* cited by examiner

*Primary Examiner* — Stephen Rosasco
(74) *Attorney, Agent, or Firm* — Birch, Stewart, Kolasch & Birch, LLP

(57) ABSTRACT

In a titania-doped quartz glass member having a surface where EUV light of up to 70 nm wavelength is reflected, a refractive index distribution in the surface has only one extreme point within a central 80% region of the member. The titania-doped quartz glass member has a surface with a high level of precision and thus can be formed into an EUV lithography photomask substrate which is improved in flatness and thermal expansion properties.

7 Claims, 10 Drawing Sheets

TITANIA-DOPED QUARTZ GLASS MEMBER AND MAKING METHOD

CROSS-REFERENCE TO RELATED APPLICATION

This non-provisional application claims priority under 35 U.S.C. §119(a) on Patent Application No. 2008-177076 filed in Japan on Jul. 7, 2008, the entire contents of which are hereby incorporated by reference.

TECHNICAL FIELD

This invention relates to titania-doped quartz glass members which are useful in EUV lithography as members, typically photomask substrates having a high surface precision, and a method for preparing the same. It also relates to EUV lithography members.

BACKGROUND ART

As is well known in the art, the degree of integration in semiconductor integrated circuits has marked remarkable progresses in recent years. In unison with this tendency, the light source used in the lithography process for the fabrication of semiconductor devices has achieved a substantial reduction of exposure wavelength. The current mainstream lithography uses an ArF excimer laser of 193 nm wavelength. In the drive to achieve a higher degree of integration, the lithography using ArF excimer laser may survive in further developed forms like immersion lithography and double patterning lithography, and a subsequent transition to lithography using extreme ultraviolet (EUV) is regarded promising.

The EUV lithography is expected to use a light source of soft x-ray having a wavelength of up to 70 nm, specifically around 13 nm. Since there are no materials which are highly transmissive in this wavelength range, the EUV lithography has to employ a reflecting optical system. While reflection occurs in this system by a reflective multi-layer film of silicon, molybdenum or the like deposited on a substrate, several tens percents of incident EUV light will not be reflected and reach the underlying substrate where it transforms into heat. Since the EUV lithography uses an extremely short wavelength light source as compared with the conventional lithography technology, the lithography precision can be adversely affected even by a slight thermal expansion of each member (e.g., substrate) in the lithographic optical system induced by the heat that has reached there. Accordingly, members like reflecting mirrors, masks, and stages must be made of low expansion materials. Titania-doped quartz glass is a typical low expansion material. The addition of a certain amount of titania makes it possible to minimize the thermal expansion of quartz glass.

In the EUV lithography with a very short wavelength light source, since the lithography precision can be adversely affected even by slight irregularities on the member surface, a high precision is required of the surface morphology. However, conventional polishing methods often fail to provide a surface morphology of high precision needed as the EUV lithography members.

Besides the conventional polishing methods, a method of providing a surface morphology of high precision, for example, high flatness is disclosed in JP-A 2006-8426 which relates to local ion beam etching on a member surface. U.S. Pat. No. 6,855,908 (EP 1251108 A1 or JP-A 2002-316835) discloses plasma etching on a member surface. However, these etching methods cause remarkable increases in the manufacture cost and retards in the manufacture time of members. There is thus a desire to manufacture members having a high surface precision necessary for EUV lithography members, using only conventional polishing methods, without resorting to the etching methods.

DISCLOSURE OF INVENTION

An object of the invention is to provide a titania-doped quartz glass member, which has a surface with a high level of precision necessary for EUV lithography members, typically EUV lithography photomask substrates, using only a conventional polishing method, or a surface with a less than desired level of precision, but capable of reducing the cost and time required in additional surface treatment by plasma or ion beam etching.

Another object is to provide an EUV lithography member, typically an EUV lithography photomask substrate having a diameter of up to 500 mm, formed of the titania-doped quartz glass member, and a method for preparing the titania-doped quartz glass member.

The inventors have found that to provide a member surface with a high level of precision necessary for EUV lithography members, an attention must be paid to the profile of a refractive index distribution of a member material which has never been considered significant in the polishing of photolithography members.

According to the invention, there are provided a titania-doped quartz glass member, an EUV lithography member, an EUV lithography photomask substrate, and a method of preparing the titania-doped quartz glass member.

[1] A titania-doped quartz glass member having a surface where EUV light of up to 70 nm wavelength is reflected, wherein a refractive index distribution in the surface has only one extreme point within a central 80% region of the member.

[2] The titania-doped quartz glass member of [1] wherein the refractive index distribution in the surface where EUV light of up to 70 nm wavelength is reflected has central symmetry with respect to the extreme point of refractive index.

[3] The titania-doped quartz glass member of [1] or [2] wherein the refractive index distribution in the surface where EUV light of up to 70 nm wavelength is reflected is in inverse correlation to an OH group concentration distribution in the surface.

[4] The titania-doped quartz glass member of any one of [1] to [3], having a refractive index variation of up to $1 \times 10^{-4}$/mm² in the surface where EUV light of up to 70 nm wavelength is reflected.

[5] The titania-doped quartz glass member of any one of [1] to [4] wherein the refractive index distribution in the surface where EUV light of up to 70 nm wavelength is reflected is free of inflection point.

[6] The titania-doped quartz glass member of any one of [1] to [5] wherein the refractive index distribution in the surface where EUV light of up to 70 nm wavelength is reflected is up to $2.5 \times 10^{-3}$.

[7] A titania-doped quartz glass member having a surface where EUV light of up to 70 nm wavelength is reflected, wherein a refractive index distribution in the surface has at least two extreme points within a central 80% region of the member, the difference in refractive index between maximum and minimum points being up to $5 \times 10^{-5}$.

[8] The titania-doped quartz glass member of any one of [1] to [7], having an average coefficient of linear thermal expansion of $-30$ to $+30$ ppb/° C. over the temperature range of 10 to 30° C.

[9] The titania-doped quartz glass member of any one of [1] to [8], having an OH group concentration distribution of up to 400 ppm.
[10] The titania-doped quartz glass member of any one of [1] to [9], having a hydrogen molecule concentration of up to $5 \times 10^{18}$ molecules/cm$^3$.
[11] The titania-doped quartz glass member of any one of [1] to [10], having a Si—H bond content of up to $5 \times 10^{17}$ bonds/cm$^3$.
[12] An EUV lithography member comprising the titania-doped quartz glass member of any one of [1] to [11].
[13] The member of [12] which is used as a photomask substrate in EUV lithography.
[14] The EUV lithography photomask substrate of [13] wherein the photomask substrate is a rectangular substrate of 152.4 mm×152.4 mm having a surface which includes a central region of 142.4 mm×142.4 mm square wherein the difference between the highest and lowest positions in the central region is up to 200 nm.
[15] A method for preparing a titania-doped quartz glass member, comprising the steps of providing a titania-doped quartz glass ingot; holding the ingot at 700 to 1,300° C. in air for 1 to 200 hours for annealing; slowly cooling the ingot down to 500° C. at a rate of 1 to 20° C./hr; placing the ingot in a shaping crucible which rotates in a furnace whose temperature distribution has a temperature gradient of at least 1.5° C./cm at 1,700° C.; and hot working the titania-doped quartz glass in the crucible.
[16] The method of [15] wherein the step of providing a titania-doped quartz glass ingot includes subjecting a silicon source gas feed and a titanium source gas feed to flame hydrolysis with the aid of a combustible gas and a combustion-supporting gas, to form synthetic silica fine particles, depositing the silica fine particles on a rotating target, and concurrently melting and vitrifying the particles to form quartz glass, wherein the target is rotated at a rotational speed of at least 5 rpm, and flow rates of the silicon source gas feed, titanium source gas feed, combustible gas, and combustion-supporting gas are controlled within a variation of ±1%/hr.
[17] The method of [15] or [16] wherein the shaping crucible rotates at a rotational speed of at least 0.1 rpm.
[18] The method of any one of [15] to [17] wherein the hot working step is conducted at a temperature of 1,500 to 1,800° C.

ADVANTAGEOUS EFFECTS OF INVENTION

The titania-doped quartz glass member of the invention has a surface with a high level of precision necessary for EUV lithography members, typically EUV lithography photomask substrates. The titania-doped quartz glass member can be formed into an EUV lithography member, typically an EUV lithography photomask substrate, which is improved in flatness and thermal expansion properties.

DESCRIPTION OF EMBODIMENTS

Figure 1:
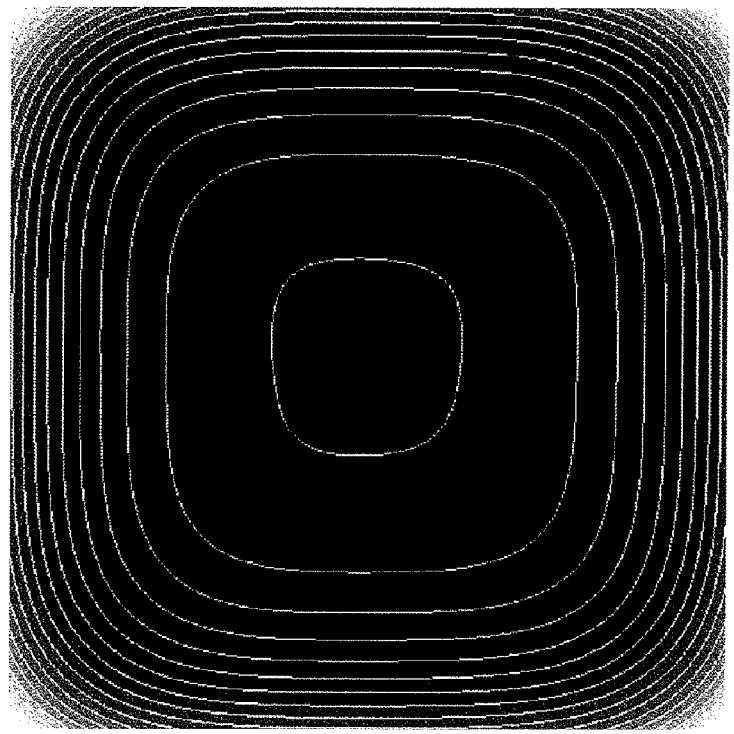
FIG. 1 illustrates a refractive index distribution in a surface of a substrate of Example 1 where EUV light of up to 70 nm wavelength, is reflected.

In the titania-doped quartz glass member of the invention having a surface where EUV light of up to 70 nm wavelength is reflected, a refractive index distribution in the surface has only one extreme point within a central 80% region of the member. This titania-doped quartz glass member is suited as optical members for use in the EUV lithography.
The EUV lithography is expected to find application to the semiconductor microfabrication technology of 32 nm and 22 nm nodes. To enable such fine size processing, optical members used in the EUV lithography are required to have a high surface precision. When a glass member is polished only by a conventional polishing method, i.e., by means of a so-called double-side lapping machine, it is difficult to achieve a high surface precision necessary as optical members for use in the EUV lithography. Even if such a high surface precision can be achieved, the productivity of the process becomes very low. For this reason, in addition to the double-side polishing, a technique of selectively grinding local areas of an optical member surface by ion beam etching, plasma etching or the like is employed to achieve a high surface precision. However, these techniques are costly in both installation and operation and need a long time for processing.

It is thus desired to achieve a surface precision required of EUV lithography optical members, without resorting to special surface processing techniques like ion beam etching and plasma etching. Even when a surface precision required of EUV lithography optical members is not met only by a conventional polishing method, it is desired to minimize the additional use of the special surface processing technique.

Studying the polishing technique capable of meeting a high surface precision required of EUV lithography optical members by a conventional polishing method using a double-side lapping machine, the inventors have learned that the refractive index distribution on a polished surface which is one of physical properties of an optical member that have never been considered in the polishing stage has an influence on the surface precision.

Specifically, a titania-doped quartz glass member having a surface where EUV light of up to 70 nm wavelength is reflected should meet that a refractive index distribution in the surface has only one extreme point of refractive index within a central 80% region of the member. When a refractive index distribution is drawn provided that a surface where EUV light of up to 70 nm wavelength is reflected is defined by X-Y axes, and a refractive index at each point in the surface is plotted on Z axis, the "extreme point" of refractive index as used herein is defined as the point that becomes minimum or maximum on the curve of a cross-section along any plane parallel to Z axis. The "central 80% region" of the member is defined as a region that is centered at the center of the member surface (where EUV light of up to 70 nm wavelength is reflected), e.g., the intersection between diagonals or the center of gravity of a rectangular or polygonal member, and accounts for 80% of the area of the member surface. The "extreme point" may be either a minimum or a maximum point. For a member having a maximum point of refractive index or a member having a minimum point of refractive index, a high surface precision can be achieved by controlling certain polishing parameters, specifically a polishing time of a polishing step in the finishing stage.

Figure 13:
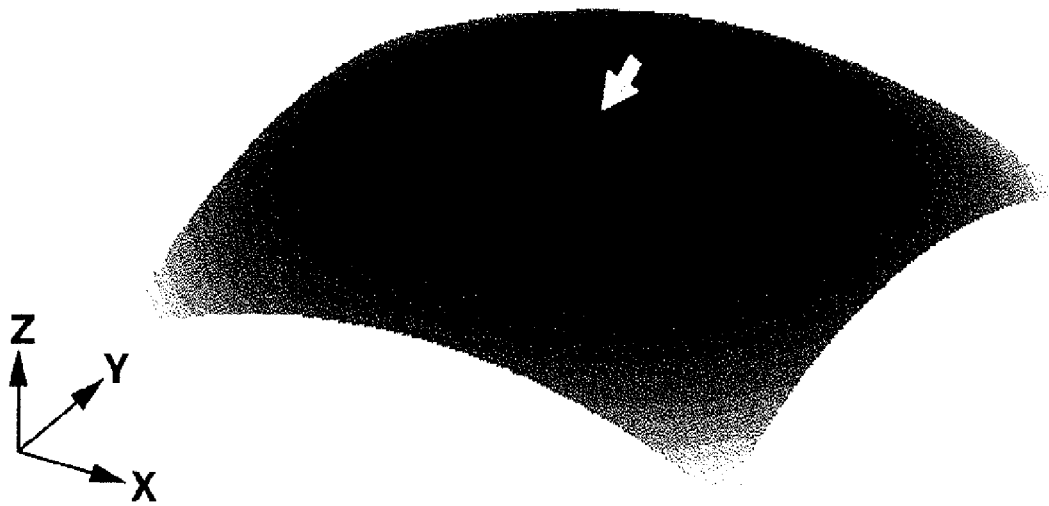
FIG. 13 illustrates an exemplary refractive index distribution in a surface of a titania-doped quartz glass member where EUV light of up to 70 nm wavelength is reflected.
Figure 14:
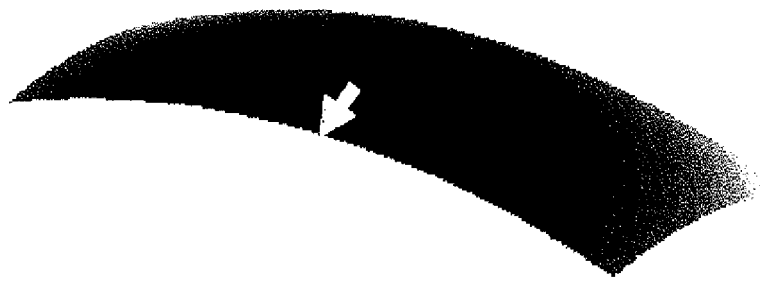
FIG. 14 is a cross-section of the refractive index distribution of FIG. 13 cut at the arrowed point parallel to X axis.
Figure 15:
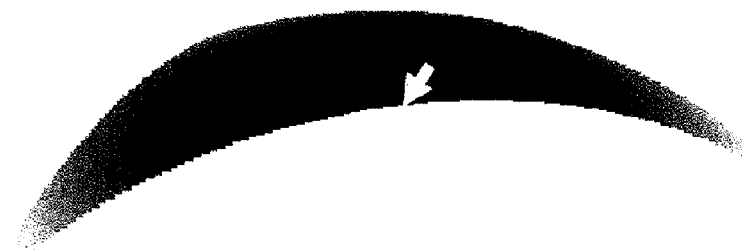
FIG. 15 is a cross-section of the refractive index distribution of FIG. 13 cut at the arrowed point along a diagonal and parallel to Z axis.

FIG. 13 illustrates one exemplary refractive index distribution in the surface of a titania-doped quartz glass member where EUV light is reflected. FIGS. 14 and 15 illustrate cross-sections of the refractive index distribution when cut across the point shown by the (white) arrow, parallel to X axis, or parallel to Z axis and along a diagonal in FIG. 13. Both the curves of the cross-sections of FIGS. 14 and 15 reach maximum at the arrowed point in FIG. 13. When the refractive index distribution is cut parallel to Z axis passing the arrowed point, the curve of the cross-section always reaches maximum at the arrowed point. This point is referred to as the maximum point. The description is also true to the minimum point.

One preferred embodiment is a titania-doped quartz glass member which in the refractive index distribution has only one extreme point of refractive index within a central 60% region of the member. More preferably, the refractive index distribution has only one extreme point of refractive index within a central 40% region of the member, and most preferably, within a central 20% region of the member. A higher surface precision is achievable as the extreme point is closer to the center of the member. It is believed that this is because a member is polished by a double-side lapping machine while the member revolves about the axis of rotation of the double-side lapping machine and spins about its own axis at the same time, although the reason is not well understood.

Where two or more extreme points of refractive index are present, it is a distorted refractive index distribution. This suggests a likelihood that uneven strains, compositional variations and the like are present in the polished surface. It is then difficult to achieve a high surface precision by the double-side polishing technique. Even when two or more extreme points of refractive index are present, no considerations are necessary if the difference in refractive index between maximum and minimum points is equal to or less than $5 \times 10^{-5}$. Even when two or more extreme points are present, they have no significant impacts on the surface precision in polishing if the refractive index difference is minute.

In a preferred embodiment of the titania-doped quartz glass member, the refractive index distribution in the surface where EUV light of up to 70 nm wavelength is reflected is up to $2.5 \times 10^{-3}$, more preferably up to $1 \times 10^{-3}$, and most preferably up to $5 \times 10^{-4}$.

In another preferred embodiment of the titania-doped quartz glass member, the refractive index distribution is free of inflection curve. In a three-dimensional curved surface representing a refractive index distribution, the term "inflection curve" used herein refers to a curve drawn by connecting the points at which the refractive index changes its distribution profile from concave to convex or from convex to concave.

In a further preferred embodiment of the titania-doped quartz glass member, the refractive index distribution in the surface where EUV light of up to 70 nm wavelength is reflected has central symmetry with respect to the extreme point of refractive index. By the term "central symmetry" as used herein, it is meant that with respect to an equi-refractive index curve of refractive index values which each differ from the refractive index value of the extreme point by $1/10$ of the difference between the refractive index value of the extreme point and a refractive index value most different from the refractive index value of the extreme point in the refractive index distribution in the surface where EUV light of up to 70 nm wavelength is reflected, the ratio of the longest distance to the shortest distance from the extreme point to the equi-refractive index curve is equal to or less than 2.

More specifically, the refractive index value on which the equi-refractive index curve is based may be determined to be:

=(refractive index at maximum)−[(refractive index at maximum)−(lowest refractive index in the same surface)]/10 where the extreme point in the refractive index distribution in the surface where EUV light of up to 70 nm wavelength is reflected is a maximum, or =(refractive index at minimum)+[(highest refractive index in the same surface)−(refractive index at minimum)]/10 where the extreme point in the refractive index distribution in the surface where EUV light of up to 70 nm wavelength is reflected is a minimum.

Figure 16:
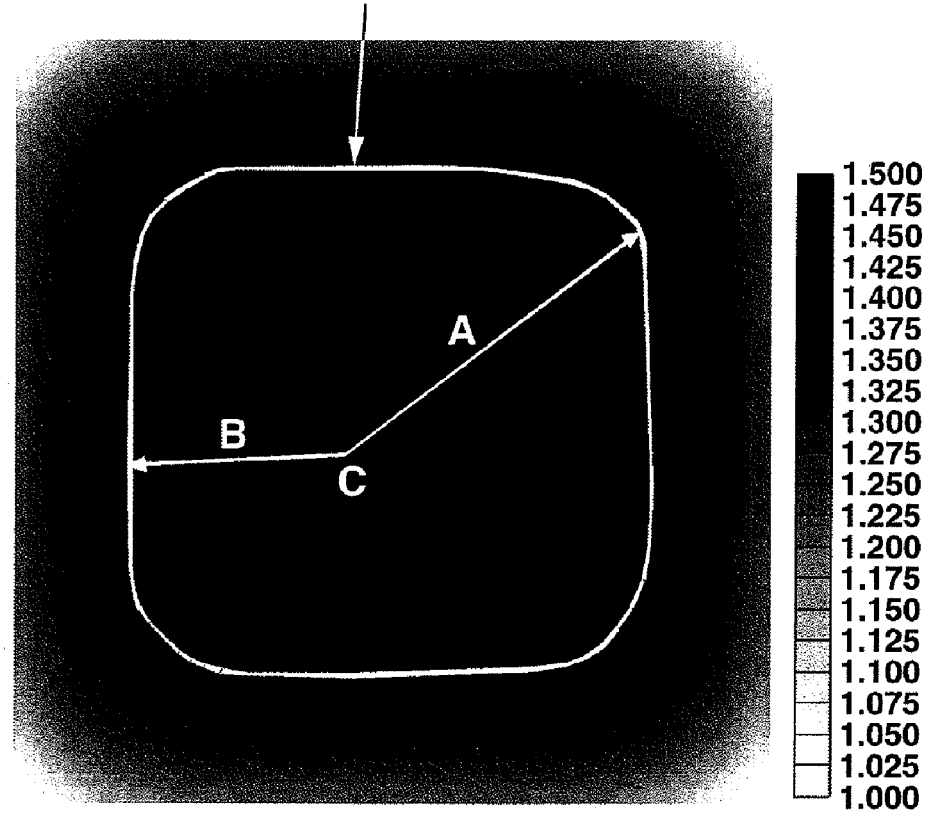
FIG. 16 illustrates the center symmetry of refractive index distribution.

In a refractive index distribution shown in FIG. 16, for example, if point C corresponding to a maximum point in the surface where EUV light of up to 70 nm wavelength is reflected has a refractive index value of 1.5000 wave, and the refractive index value most different from the extreme point in the relevant surface is 1.0000 wave (wherein a refractive index value is expressed in unit "wave" for the sake of convenience), then an equi-refractive index curve is drawn by connecting those points having a refractive index drawn by connecting those points having a refractive index drawn value of 1.4500 wave. In a preferred embodiment, the ratio of the longest distance to the shortest distance from the extreme point to the equi-refractive index curve is equal to or less than 1.75. Since the member is polished while it spins about its own axis as pointed out above, a higher surface precision is achievable from a member having a refractive index distribution of higher symmetry.

In a further preferred embodiment of the titania-doped quartz glass member, the refractive index distribution in the surface where EUV light of up to 70 nm wavelength is reflected is in inverse correlation to an OH group concentration distribution in the relevant surface. Investigating the surface precision versus the physical properties of a member, the inventors have found that a higher surface precision is achievable when the refractive index distribution in the surface where EUV light of up to 70 nm wavelength is reflected is in inverse correlation to an OH group concentration distribution in the relevant surface. Although the reason is not well understood, it is believed that the physical properties of a member, the reactivity with abrasives, and the like are involved. Likewise, the OH group concentration distribution is preferably in positive correlation to an imaginary temperature distribution.

Notably, the titania-doped quartz glass in which the refractive index distribution in the surface where EUV light of up to 70 nm wavelength is reflected is in inverse correlation to an OH group concentration distribution in the relevant surface may be effectively produced by the direct process rather than the indirect process. The direct process involves feeding a hydrogen-containing combustible gas and an oxygen-containing combustion-supporting gas to a burner set in a quartz glass-manufacturing furnace for combustion, thereby forming an oxyhydrogen flame at the burner tip, introducing a silicon source gas feed and a titanium source gas feed into the oxyhydrogen flame for subjecting the silicon and titanium source gas feeds to hydrolysis to produce silicon oxide, titanium oxide and composites thereof in fine particle form, depositing the fine particles on a target disposed forward of the burner, and continuing growth, whereas the indirect process involves preparing titania-doped quartz glass from a titania-doped porous silica matrix. Even when the direct process is employed, the supply amount of the silicon source gas feed is desirably low. For example, when silicon tetrachloride is used as the silicon source gas feed, it is desirably fed at a flow rate of up to 2,000 g/hr. This is accounted for probably by the fact that the state of gas feeds injected from the burner differs depending on the supply amount of the silicon source gas feed.

In a further preferred embodiment, the titania-doped quartz glass member has a refractive index variation of up to $1\times10^{-4}/mm^2$ in the surface where EUV light of up to 70 nm wavelength is reflected. As described above, a titania-doped quartz glass member having a high surface precision is obtainable by controlling the refractive index distribution in the surface where EUV light of up to 70 nm wavelength is reflected. However, if the refractive index abruptly changes in the reflecting surface, it is difficult to achieve a high surface precision with the double-side polishing method. It is believed that such abrupt changes of refractive index are partially induced by variations of parameters during preparation of titania-doped quartz glass. Since strain or the like is likely to accumulate in a region of abruptly changing refractive index, this region is often different in polishing rate from other regions, which leads to a reduction of surface precision.

In a more preferred embodiment of the invention, the titania-doped quartz glass member has a refractive index variation of up to $5\times10^{-5}/mm^2$ in the surface where EUV light of up to 70 nm wavelength is reflected.

The titania-doped quartz glass having a refractive index variation of up to $1\times10^{-4}/mm^2$ in the surface where EUV light of up to 70 nm wavelength is reflected may be obtainable when the flow rates of a combustible gas, combustion-supporting gas, silicon source gas feed, and titanium source gas feed used in the process of preparing a titania-doped quartz glass ingot or titania-doped porous silica matrix are controlled within a variation of ±1%/hr and the target is rotated at a rotational speed of at least 5 rpm.

It is noted that a refractive index is measured by the oil-on plate method using a Fizeau interferometer (Zygo Mark IV) combined with a light source in the form of He—Ne laser of 632.8 nm wavelength emission. Specifically, the space between two parallel plates of quartz glass having a low refractive index distribution is filled with an oil having a refractive index equal to the quartz glass, and the refractive index distribution of parallel plates is previously measured. Then a titania-doped quartz glass member which has been polished on opposite surfaces is interposed between the parallel plates, the spaces between the parallel plates and the member are filled with the oil, and the refractive index distribution of parallel plates plus titania-doped quartz glass member is measured. The refractive index distribution of titania-doped quartz glass member is determined by subtracting the refractive index distribution of parallel plates from the refractive index distribution of parallel plates plus titania-doped quartz glass member.

In a further preferred embodiment, the titania-doped quartz glass has an average coefficient of linear thermal expansion in the range of −30 to +30 ppb/° C. at a room temperature level of 10 to 30° C. The room temperature level is a temperature range corresponding to the operating temperature of EUV lithography. If the average coefficient of linear thermal expansion is outside the range, the lass may lose usefulness as EUV lithography members, typically EUV lithography photomask substrates. It is noted that an average coefficient of linear thermal expansion is measured by a precision thermodilatometer (by NETZSCH) using a cylindrical sample of 3.5 mm diameter and 25 mm. EUV lithography members, typically EUV lithography photomask substrates formed of such titania-doped quartz glass have a similar average coefficient of linear thermal expansion.

Thermal expansion properties may sometimes be affected by an OH group concentration in titania-doped quartz glass. This is presumably because bond networks between oxygen and silicon or titanium can be cleaved by OH groups. Thus, in a preferred embodiment, the titania-doped quartz glass has an OH group concentration distribution of up to 400 ppm, more preferably up to 200 ppm, and even more preferably up to 50 ppm. The "OH group concentration distribution" as used herein refers to the difference between maximum and minimum of concentration difference when a OH group concentration is determined throughout the titania-doped quartz glass. If the OH group concentration distribution is in excess of 400 ppm, an average coefficient of linear thermal expansion in the range of −30 to +30 ppb/° C. over 10 to 30° C. may not be available. For reducing the OH group concentration distribution, it is preferred to keep in soaked (or evenly heated) condition the growth face during preparation of a titania-doped quartz glass ingot. To this end, the rotational speed of the target is kept at 5 rpm or higher. An OH group concentration may be measured by an infrared spectrophotometer. Specifically, it may be determined from an absorption coefficient at wavenumber 4522 cm$^{-1}$ as measured by a Fourier transform infrared spectrophotometer, in accordance with the equation:

OH group concentration (ppm)=(absorption coefficient at 4522 cm$^{-1}$)/T×4400 wherein T is a thickness (cm) of a sample.

In the EUV lithography, EUV light which has reached the substrate without being reflected by a reflective multi-layer film (of silicon, molybdenum or the like) deposited on the substrate is transformed into heat and sometimes causes semi-permanent changes to the substrate material. Particularly in the case of titania-doped quartz glass, if the glass contains amounts of hydrogen molecules and Si—H bonds, EUV light may cause changes to the valence number of titanium element in titania-doped quartz glass and to the structure of titania-doped quartz glass to alter its coefficient of thermal expansion.

In a preferred embodiment, the titania-doped quartz glass has a hydrogen molecule concentration of up to $5 \times 10^{18}$ molecules/cm$^3$, more preferably up to $1 \times 10^{18}$ molecules/cm$^3$, and even more preferably up to $5 \times 10^{17}$ molecules/cm$^3$. The hydrogen molecule concentration may be measured by the Raman spectroscopy, specifically by the method described in Zurnal Pril; adnoi Spektroskopii Vol. 46, No. 6, pp 987-991, June 1987.

In a preferred embodiment, the titania-doped quartz glass has a Si—H bond content of up to $5 \times 10^{17}$ bonds/cm$^3$, more preferably up to $1 \times 10^{17}$ bonds/cm$^3$, and even more preferably up to $5 \times 10^{16}$ bonds/cm$^3$. The hydrogen molecule concentration and Si—H bond content in the titania-doped quartz glass may be controlled by adjusting the gas feeds injected from the main burner during preparation of a titania-doped quartz glass ingot so as to provide a hydrogen/oxygen supply ratio of up to 2.5. The Si—H bond content may be measured by the Raman spectroscopy, specifically by the method described in JP-A H09-59034.

The titania-doped quartz glass may contain elements other than silicon, titanium, oxygen, hydrogen and chlorine as long as the contents of other elements are each up to 1,000 ppm. Although inclusion of elements other than silicon, titanium, oxygen, hydrogen and chlorine may cause some variations to the average coefficient of linear thermal expansion over 10 to 30° C. of titania-doped quartz glass, an average coefficient of linear thermal expansion in the range of −30 to +30 ppb/° C. is available by adjusting the amount of titania.

The titania-doped quartz glass of the invention is useful as members, typically photomask substrates in the EUV lithography. In particular, EUV lithography photomask substrates must have a high precision in surface roughness in order to enable transfer of a pattern of high image quality and fine size onto a wafer. From the titania-doped quartz glass of the invention, EUV lithography photomask substrates can be formed which meet the requirement of such high precision.

Specifically, from the titania-doped quartz glass of the invention, photomask substrates can be formed which have a surface roughness (Rms) of up to 0.30 nm, preferably up to 0.20 nm, and more preferably up to 0.15 nm, after polishing. It is noted that the surface roughness (Rms) may be measured under an atomic force microscope. For example, a photomask substrate of 152.4 mm×152.4 mm square preferably has a surface roughness (Rms) in the above-defined range over a central region of 142.4 mm×142.4 mm square.

In the EUV lithography photomask substrate, the flatness of a region of the photomask substrate which is actually accessed upon exposure of an EUV lithography photomask of 152.4 mm×152.4 mm square (i.e., a central region of 142.4 mm×142.4 mm square in the photomask substrate surface) and the flatness of every 1 mm$^2$ area in the region of 142.4 mm×142.4 mm square must also have a high precision. From the titania-doped quartz glass of the invention, EUV lithography photomask substrates can be formed which meet the required high precision.

From the titania-doped quartz glass of the invention, EUV lithography photomask substrates can be formed in which the difference between the highest and the lowest positions (also referred to as peak-to-valley (P-V) flatness) within a central region of 142.4 mm×142.4 mm square in the substrate surface as polished is up to 200 nm, preferably up to 100 nm, and more preferably up to 50 nm. Also EUV lithography photomask substrates can be formed in which the difference between the highest and the lowest positions (also referred to as PV flatness) within every 1 mm$^2$ area in a central region of 142.4 mm×142.4 mm square in the substrate surface as polished is up to 20 nm, preferably up to 10 nm, and more preferably up to 5 nm.

It is noted that these P-V flatnesses may be evaluated by measuring the difference between the highest and the lowest positions within a central region of 142.4 mm×142.4 mm square on the photomask substrate every or within every 1 mm$^2$ area in the central region of 142.4 mm×142.4 mm square using a laser interferometer. If these P-V flatnesses are outside the ranges, the surface morphology required of EUV lithography photomask substrates may not be met.

It is noted that the difference between the highest and the lowest positions (P-V flatness) within a central region of 142.4 mm×142.4 mm square in the substrate surface and the difference between the highest and the lowest positions (P-V flatness) within every 1 mm$^2$ area in the central region of 142.4 mm×142.4 mm square are closely correlated to a variation of refractive index within the surface where EUV light of up to 70 nm wavelength is reflected. It is then recommended that the flow rates of the combustible gas, combustion-supporting gas, silicon source gas feed, and titanium source gas feed be controlled within a variation of ±1%/hr, and the rotational speed of the target be controlled at or above 5 rpm.

A substrate having the above-defined surface roughness, flatness and P-V flatness may be obtainable by mirror polishing (by means of a double-side lapping machine) a titania-doped quartz glass member which is prepared by the titania-doped quartz glass preparation method to be described later, contains 3 to 12% by weight of titania, and has a refractive index distribution in a surface where EUV light of up to 70 nm wavelength is reflected, having only one extreme point of refractive index in a central 80% region of the member, and especially, which has an refractive index variation within $1 \times 10^{-4}$/mm$^2$ in the surface where EUV light of up to 70 nm wavelength is reflected, and an OH group concentration distribution in inverse correlation to the refractive index distribution.

In general, titania-doped quartz glass may be produced by feeding a hydrogen-containing combustible gas and an oxygen-containing combustion-supporting gas to a burner built in a quartz glass-manufacturing furnace, burning the gases to form an oxyhydrogen flame at the burner tip, introducing a silicon source gas feed and a titanium source gas feed into the oxyhydrogen flame for subjecting the silicon and titanium source gas feeds to hydrolysis to produce silicon oxide, titanium oxide and composites thereof in fine particle form, depositing the fine particles on a target disposed forward of the burner, continuing growth until a titania-doped quartz glass ingot is formed, hot working the shaped ingot into a predetermined shape, annealing the shaped ingot, and slow cooling. The titania-doped quartz glass of the invention may be produced by the above process in which the fine particles are deposited on the target while the flow rates of the combustible gas, combustion-supporting gas, silicon source gas feed, and titanium source gas feed are controlled within a variation of ±1%/hr, the temperatures of air flowing through the quartz glass-manufacturing furnace, exhaust gas from the furnace, and ambient air surrounding the furnace are controlled within a variation of ±2.5° C., and the target is rotated at a rotational speed of at least 5 rpm.

The quartz glass-manufacturing furnace may be of vertical or horizontal type. The target of a seed or similar material is rotated at a rotational speed of at least 5 rpm, preferably at least 15 rpm, and more preferably at least 30 rpm. This is because striae, strains or structurally or compositionally non-uniform zones generate, depending largely on the unevenness of temperature in a portion where titania-doped quartz glass grows on the rotating target. Then the generation of structurally or compositionally non-uniform zones in titania-doped quartz glass can be inhibited by increasing the rotational speed of the target so that an even temperature may be available in a portion where titania-doped quartz glass grows. The upper limit of rotational speed of the target may be selected as appropriate although it is usually up to 200 rpm.

The generation of structurally or compositionally non-uniform zones in titania-doped quartz glass can also be inhibited by supplying the silicon source gas feed, titanium source gas feed, combustible gas, and combustion-supporting gas at steady rates. To this end, in the process of the invention, the flow rates of the silicon source gas feed, titanium source gas feed, combustible gas, and combustion-supporting gas are each controlled within a variation of ±1%/hr, preferably ±0.5%/hr, and more preferably ±0.25%/hr. If the flow rates of the combustible gas, combustion-supporting gas, silicon source gas feed, and titanium source gas feed each have a variation of more than ±1%/hr, and the temperatures of air flowing through the quartz glass-manufacturing furnace, exhaust gas from the furnace, and ambient air surrounding the furnace each have a variation of more than ±2.5° C., then structurally or compositionally non-uniform zones will generate in titania-doped quartz glass being prepared under such conditions. It is then difficult to obtain titania-doped quartz glass having a high precision enough to meet the requirement of EUV lithography members, typically EUV lithography photomask substrates.

The silicon source gas feed used herein may be selected from well-known organosilicon compounds, for example, silicon tetrachloride, chlorosilanes such as dimethyldichlorosilane and methyltrichlorosilane, and alkoxysilanes such as tetramethoxysilane, tetraethoxysilane, and methyltrimethoxysilane.

The titanium source gas feed used herein may also be selected from well-known compounds, for example, titanium halides such as titanium tetrachloride and titanium tetrabromide, and titanium alkoxides such as tetraethoxytitanium, tetraisopropoxytitanium, tetra-n-propoxytitanium, tetra-n-butoxytitanium, tetra-sec-butoxytitanium, and tetra-t-butoxytitanium.

On the other hand, the combustible gas used herein may be one containing hydrogen, optionally in combination with another gas such as carbon monoxide, methane and propane. The combustion-supporting gas used herein may be one containing oxygen.

The titania-doped quartz glass member of the invention is shaped into a desired shape suited for a particular EUV lithography member such as a mirror, stage or photomask substrate, by hot working at a temperature of 1,500 to 1,800° C. for 1 to 10 hours. Preferably hot working is conducted such that the axis of the shape is parallel to the growth axis of the titania-doped quartz glass grown in the manufacture furnace. Also preferably, hot working is conducted in a furnace whose internal temperature distribution has a temperature gradient of at least 1.50° C./cm and preferably up to 10.0° C./cm at 1,700° C. The "temperature gradient" of the temperature distribution in the furnace refers to, provided that the highest temperature zone in the furnace is 1,700° C., an average temperature gradient determined from the temperature difference between the highest temperature zone and a position spaced 500 mm above the highest temperature zone in the furnace. Also no-load hot working is desired. Further desirably, the furnace includes a shaping crucible having a circular bottom or a rectangular or polygonal bottom for receiving the titania-doped quartz glass such that the titania-doped quartz glass is aligned with the center of the circular bottom or the intersection between diagonals or the center of gravity of the rectangular or polygonal bottom, and a mechanism for rotating the shaping crucible having received the titania-doped quartz glass. The shaping crucible is desirably rotated at a rotational speed of at least 0.1 rpm, preferably 0.1 to 10 rpm, more preferably 0.5 to 5 rpm, and even more preferably 1 to 3 rpm. If the shaping crucible is rotated at a speed of less than 0.1 rpm or not rotated, it is difficult to evenly apply heat to the titania-doped quartz glass, causing buckling or the like. Inversely, if the rotational speed is too high, centrifugal force may generate during hot working on the titania-doped quartz glass, also causing buckling or the like.

The furnace construction described above is employed because it permits heat to be evenly applied to the titania-doped quartz glass in a direction perpendicular to the shaping axis during hot working, and is effective for preventing the titania-doped quartz glass from buckling or from leaning on the side wall of the shaping crucible during hot working. Hot working is conducted to such a size that the distance from the bottom center of the shaping crucible to the outer periphery of titania-doped quartz glass as worked is up to 1.3 times the radius of titania-doped quartz glass manufactured in the manufacture furnace. Where the shaping crucible has a rectangular or polygonal bottom, hot working is conducted to a size up to 1.3 times the distance from the intersection of diagonals or the center of gravity to the shortest outer periphery. Then, if the desired EUV lithography member is larger than the diameter of titania-doped quartz glass manufactured in the manufacture furnace, hot working must be conducted several times. Where a plurality of hot working steps must be conducted, the first hot working is conducted in a shaping crucible configured conformal to the desired EUV lithography member, and subsequent hot working is repeated while maintaining the conformal shape.

The titania-doped quartz glass member of the invention has a diameter of up to 500 mm. A member having a diameter beyond the limit is difficult to maintain an appropriate temperature gradient during hot working and to minimize a temperature variation in the furnace.

After the hot working, the titania-doped quartz glass is annealed and slowly cooled. These annealing and slow cooling steps are effective for mitigating any strain or distortion induced in titania-doped quartz glass by hot working. Annealing may be conducted under well-known conditions, for example, at a temperature of 700 to 1,300° C. in air for 1 to 200 hours. Slow cooling may be conducted under well-known conditions, for example, at a rate of 1 to 200° C./hr from the annealing temperature to a temperature of 500° C.

After the annealing and slow cooling, the titania-doped quartz glass is worked into a predetermined size by machining or slicing and then polished by a double-side lapping machine with an abrasive such as silicon oxide, aluminum oxide, molybdenum oxide, silicon carbide, diamond, cerium oxide or colloidal silica. The polishing conditions vary depending on the type of extreme point in the refractive index distribution in the surface to be polished, that is, the surface where EUV light of up to 70 nm wavelength is reflected. Specifically, in a polishing procedure including polishing with cerium oxide abrasive and finish polishing with colloidal silica abrasive, if the extreme point in the refractive index distribution in the surface where EUV light of up to 70 nm wavelength is reflected, as measured by a laser interferometer, is a maximum point, the polishing procedure is continued for a longer time than in the case of a titania-doped quartz glass member having a refractive index distribution with a minimum point, whereby a higher surface precision is obtainable.

EXAMPLE

Examples and Comparative Examples are given below for illustrating the invention although the invention is not limited thereto.

Example 1

Figure 17A:
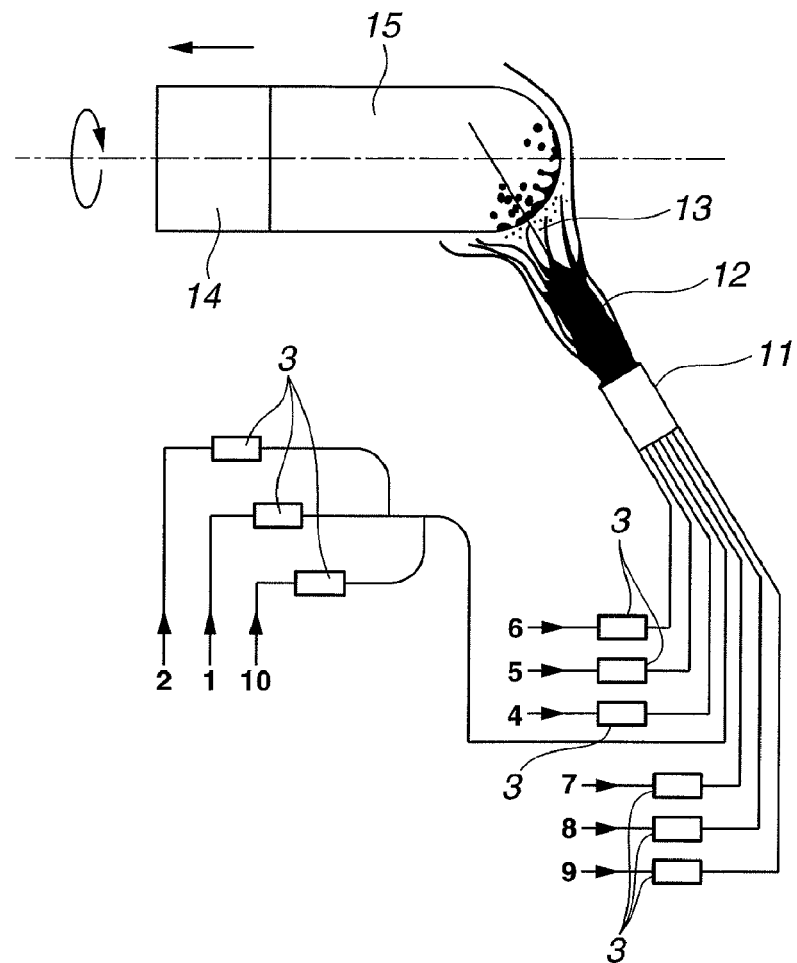
FIG. 17 illustrates a burner system used in Examples 1 to 3 and Comparative Examples 1 and 2, FIG. 17a being a schematic view of the overall system and FIG. 17b being a transverse section of the burner.
Figure 17B:
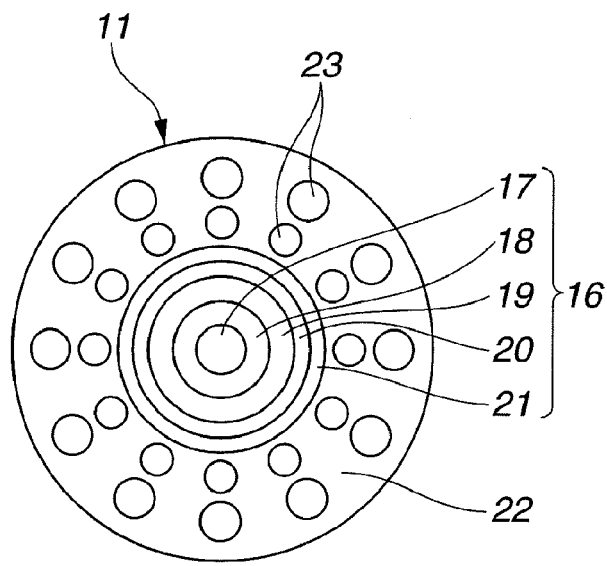

A burner as shown in FIG. 17 was used which is described in JP-A H08-31723. The titania-doped quartz glass manufacture system illustrated in FIG. 17a includes a $SiCl_4$ feed line 1, a $TiCl_4$ feed line 2, flow meters 3, hydrogen gas feed lines 4 to 6, oxygen gas feed lines 7 to 10, a quartz main burner 11 for producing an oxyhydrogen flame 12 and titania-doped silica fine particles 13, and a support or target 14 on which an ingot 15 is grown. FIG. 17b is a transverse cross-section of burner 11, including a five-fold tube 16 consisting of five nozzles 17 to 21, an outer shell 22 outside tube 16, and nozzles 23 inside outer shell 22. The central or first nozzle 17 receives $SiCl_4$ and $TiCl_4$ from the $SiCl_4$ and $TiCl_4$ feed lines 1 and 2 and oxygen gas from the oxygen gas feed line 10. An inert gas such as argon gas may also be fed if desired. The second and fourth nozzles 18 and 20 receive oxygen gas from the oxygen gas feed lines 7 and 8, and the third and fifth nozzles 19 and 21 receive hydrogen gas from the hydrogen gas feed lines 4 and 5. The outer shell 22 receives hydrogen gas from the hydrogen gas feed line 6, and the nozzle 23 receives oxygen gas from the oxygen gas feed line 9.

An ingot of titania-doped quartz glass was prepared by feeding the gases shown in Table 1 to the respective nozzles of the main burner, forming an oxyhydrogen flame, effecting hydrolytic reaction of silicon tetrachloride and titanium tetrachloride in the oxyhydrogen flame to produce $SiO_2$ and $TiO_2$, depositing titania-doped silica fine particles on a target disposed forward of the burner, and continuing growth. The target was rotated at 50 rpm and retracted at 10 mm/hr. In addition to the main burner, a sub-burner (not shown) was used to apply an oxyhydrogen flame to the side surface of the ingot. The flow rates of different gases were kept within a variation of ±0.2%/hr. During preparation of titania-doped quartz glass in the manufacture furnace, the temperatures of air to the furnace, exhaust gas from the furnace and ambient air around the furnace were kept within a variation of ±1° C.

In an electric furnace having a temperature gradient of 2.5° C./cm at 1,700° C., the resulting ingot of 120 mm diameter and 400 mm length was placed in a columnar crucible having a square bottom of 155 mm×155 mm such that the ingot was aligned with the intersection between diagonals on the square crucible bottom. The ingot was hot worked by heating at 1,700° C. for 6 hours. During hot working, the crucible was rotated at 2 rpm. The ingot was held in air at 1,150° C. for 150 hours for annealing, and then slowly cooled down to 500° C. at a rate of 5° C./hr. The ingot as annealed was machined to a square prism of 152.4 mm×152.4 mm, obtaining a titania-doped quartz glass ingot I. This ingot I was machined into a photomask substrate by slicing to a thickness of 6.7 mm. A refractive index distribution in the surface of 152.4 mm×152.4 mm square was measured. FIG. 1 shows the measured refractive index distribution whose profile had a maximum point within a central 20% region of the 152.4 mm×152.4 mm square surface. Otherwise, neither extreme point nor inflection curve was found.

A ratio of longest distance to shortest distance from the extreme point to an equi-refractive index curve of a refractive index value which differs by $\frac{1}{10}$ from the refractive index value of the extreme point in the 152.4 mm×152.4 mm square surface was 1.49. The refractive index distribution in the 152.4 mm×152.4 mm square surface had central symmetry with respect to the maximum point. A refractive index distribution in a region where a variation of refractive index was the largest was measured to be $3.5 \times 10^{-5}/mm^2$.

The titania-doped quartz glass substrate or slice of 152.4 mm×152.4 mm×6.7 mm thick, which had been measured for refractive index, was polished for 6 hours by a double-side lapping machine Model 12B (Fujikoshi Machinery Corp.) using a suede-type polishing pad and cerium oxide abrasive and then for 1 hour using colloidal silica abrasive. For the substrate thus obtained, a difference between the highest and lowest positions in a central region of 142.4 mm×142.4 mm square in the substrate surface was measured using a laser interferometer. The result is reported in Table 2 as P-V flatness in exposure-accessible region.

Figure 2:
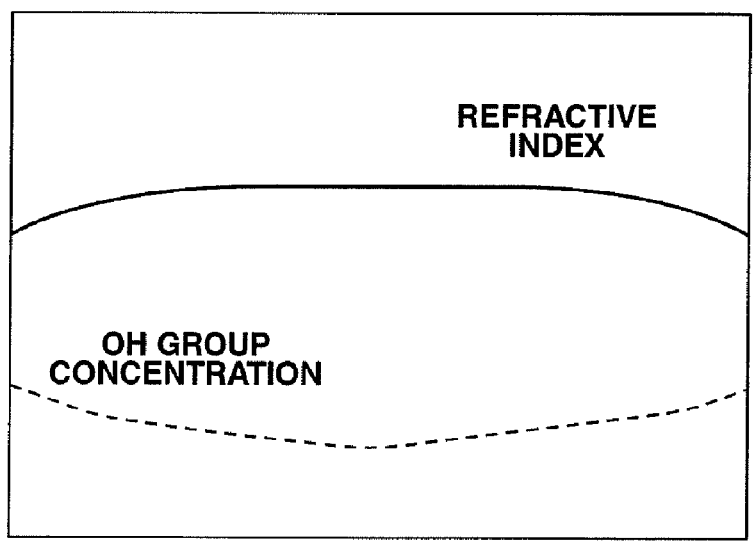
FIG. 2 illustrates an OH group concentration distribution and a refractive index distribution measured along a diagonal of the surface of the substrate of Example 1 where EUV light of up to 70 nm wavelength is reflected.

An OH group concentration distribution and a refractive index distribution, both measured along a diagonal of the substrate, are shown in FIG. 2. Evidently the refractive index distribution was in inverse correlation to the OH group concentration distribution. The difference between the maximum and minimum values of OH group concentration distribution is shown in Table 2 as OH group concentration distribution.

A hydrogen molecule concentration and a Si—H bond content were measured along a diagonal of the substrate, with the results shown in Table 2.

For titania-doped quartz glass ingot I, an average coefficient of linear thermal expansion was measured at ten points along a diagonal of the 152.4 mm×152.4 mm square surface over a temperature range of 10 to 30° C. The maximum and minimum values are shown in Table 2.

It was demonstrated that the titania-doped quartz glass member thus obtained had only one maximum point within a central region of a surface where EUV light of up to 70 nm wavelength is reflected, the refractive index distribution had central symmetry with respect to the maximum point and inverse correlation to the OH group concentration distribution, and the refractive index variation was satisfactorily low. The photomask substrate as polished had a low P-V flatness in a central 142.4 mm×142.4 mm square region of its surface and was suited as an EUV photomask substrate.

Example 2

An ingot of titania-doped quartz glass was prepared using the burner system shown in FIG. 17, specifically by feeding the gases shown in Table 1 to the respective nozzles of the main burner, forming an oxyhydrogen flame, effecting hydrolytic reaction of silicon tetrachloride and titanium tetrachloride in the oxyhydrogen flame to produce $SiO_2$ and $TiO_2$, and depositing titania-doped silica fine particles on a target disposed forward of the burner. The target was rotated at 50 rpm and retracted at 10 mm/hr. The flow rates of different gases were kept within a variation of ±0.2%/hr. During preparation of titania-doped quartz glass in the manufacture furnace, the temperatures of air to the furnace, exhaust gas from the furnace and ambient air around the furnace were kept within a variation of ±1° C.

Figure 3:
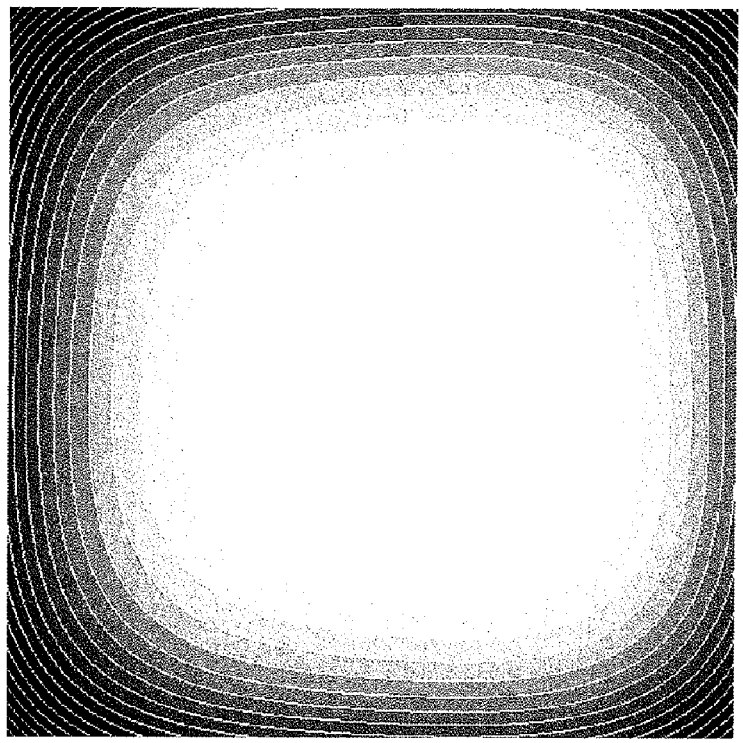
FIG. 3 illustrates a refractive index distribution in a surface of a substrate of Example 2 where EUV light of up to 70 nm wavelength is reflected.

In an electric furnace having a temperature gradient of 2.5° C./cm at 1,700° C., the resulting ingot of 120 mm diameter and 400 mm length was placed in a columnar crucible having a square bottom of 155 mm×155 mm such that the ingot was aligned with the intersection between diagonals on the square crucible bottom. The ingot was hot worked by heating at 1,700° C. for 6 hours. During hot working, the crucible was rotated at 2 rpm. The ingot was held in air at 1,150° C. for 150 hours for annealing, and then slowly cooled down to 500° C. at a rate of 5° C./hr. The ingot as annealed was machined to a square prism of 152.4 mm×152.4 mm, obtaining a titania-doped quartz glass ingot I. This ingot I was machined into a photomask substrate by slicing to a thickness of 6.7 mm. A refractive index distribution in the surface of 152.4 mm×152.4 mm square was measured. FIG. 3 shows the measured refractive index distribution whose profile had a minimum point within a central 20% region of the 152.4 mm×152.4 mm square surface. Otherwise, neither extreme point nor inflection curve was found.

A ratio of longest distance to shortest distance from the extreme point to an equi-refractive index curve of a refractive index value which differs by 1/10 from the refractive index value of the extreme point in the 152.4 mm×152.4 mm square surface was 1.66. The refractive index distribution in the 152.4 mm×152.4 mm square surface had central symmetry with respect to the minimum point. A refractive index distribution in a region where a variation of refractive index was the largest was measured to be $3.5 \times 10^{-5}$ mm².

The titania-doped quartz glass substrate of 152.4 mm×152.4 mm×6.7 mm thick, which had been measured for refractive index, was polished for 6 hours by a double-side lapping machine Model 12B (Fujikoshi Machinery Corp.) using a suede-type polishing pad and cerium oxide abrasive and then for 0.5 hour using colloidal silica abrasive. For the substrate thus obtained, a difference between the highest and lowest positions in a central region of 142.4 mm×142.4 mm square in the substrate surface was measured using a laser interferometer. The result is reported in Table 2 as P-V flatness in exposure-accessible region.

Figure 4:
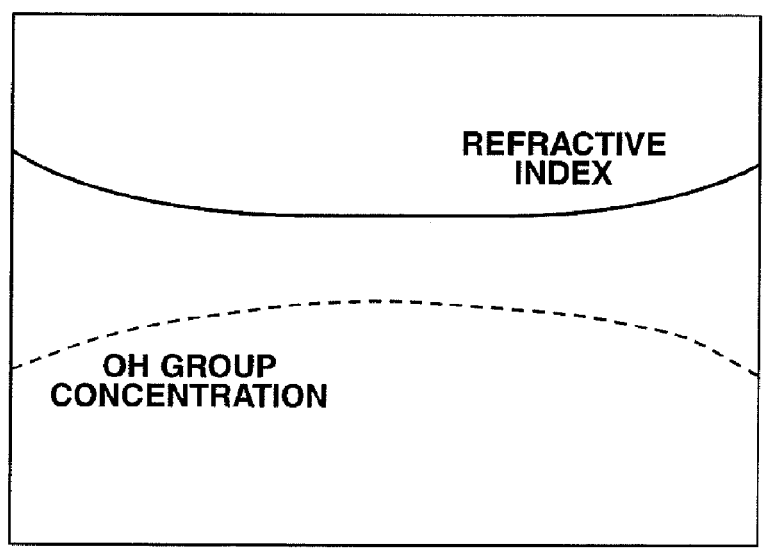
FIG. 4 illustrates an OH group concentration distribution and a refractive index distribution measured along a diagonal of the surface of the substrate of Example 2 where EUV light of up to 70 nm wavelength is reflected.

An OH group concentration distribution and a refractive index distribution, both measured along a diagonal of the substrate, are shown in FIG. 4. Evidently the refractive index distribution was in inverse correlation to the OH group concentration distribution. The difference between the maximum and minimum values of OH group concentration distribution is shown in Table 2 as OH group concentration distribution.

A hydrogen molecule concentration and a Si—H bond content were measured along a diagonal of the substrate, with the results shown in Table 2.

For titania-doped quartz glass ingot I, an average coefficient of linear thermal expansion was measured at ten points along a diagonal of the 152.4 mm×152.4 mm square surface over a temperature range of 10 to 30° C. The maximum and minimum values are shown in Table 2.

It was demonstrated that the titania-doped quartz glass member thus obtained had only one minimum point within a central region of a surface where EUV light of up to 70 nm wavelength is reflected, the refractive index distribution had central symmetry with respect to the minimum point and inverse correlation to the OH group concentration distribution, and the refractive index variation was satisfactorily low. The photomask substrate as polished had a low P-V flatness in a central 142.4 mm×142.4 mm square region of its surface and was suited as an EUV photomask substrate.

Example 3

An ingot of titania-doped quartz glass was prepared using the burner system shown in FIG. 17, specifically by feeding the gases as in Example 1 to the respective nozzles of the main burner and sub-burner, forming an oxyhydrogen flame, effecting hydrolytic reaction of silicon tetrachloride and titanium tetrachloride in the oxyhydrogen flame to produce $SiO_2$ and $TiO_2$, and depositing titania-doped silica fine particles on a target disposed forward of the burner. The target was rotated at 50 rpm and retracted at 10 mm/hr. The flow rates of different gases were kept within a variation of ±0.2%/hr. During preparation of titania-doped quartz glass in the manufacture furnace, the temperatures of air to the furnace, exhaust gas from the furnace and ambient air around the furnace were kept within a variation of ±1° C.

Figure 5:
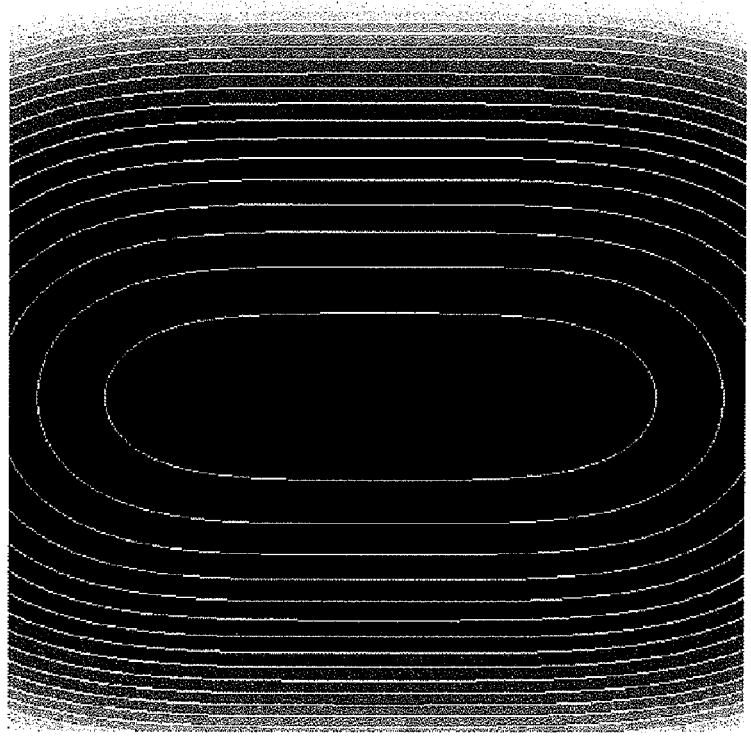
FIG. 5 illustrates a refractive index distribution in a surface of a substrate of Example 3 where EUV light of up to 70 nm wavelength is reflected.

In an electric furnace having a temperature gradient of 2.5° C./cm at 1,700° C., the resulting ingot of 120 mm diameter and 400 mm length was placed in a columnar crucible having a square bottom of 155 mm×155 mm such that the ingot was aligned with a position which is shifted 20 mm from the intersection between diagonals on the square crucible bottom and in a direction of 45° relative to the diagonals. The ingot was hot worked by heating at 1,700° C. for 6 hours. During hot working, the crucible was rotated at 2 rpm. The ingot was held in air at 1,150° C. for 150 hours for annealing, and then slowly cooled down to 500° C. at a rate of 5° C./hr. The ingot as annealed was machined to a square prism of 152.4 mm×152.4 mm, obtaining a titania-doped quartz glass ingot I. This ingot I was machined into a photomask substrate by slicing to a thickness of 6.7 mm. A refractive index distribution in the surface of 152.4 mm×152.4 mm square was measured. FIG. 5 shows the measured refractive index distribution whose profile had a maximum point within a central 20% region of the 152.4 mm×152.4 mm square surface. Otherwise, neither extreme point nor inflection curve was found.

A ratio of longest distance to shortest distance from the extreme point to an equi-refractive index curve of a refractive index value which differs by 1/10 from the refractive index value of the extreme point in the 152.4 mm×152.4 mm square surface was 2.52. The refractive index distribution in the 152.4 mm×152.4 mm square surface had not central symmetry with respect to the maximum point. A refractive index distribution in a region where a variation of refractive index was the largest was measured to be $5.8 \times 10^{-5}$/mm².

The titania-doped quartz glass substrate of 152.4 mm×152.4 mm×6.7 mm thick, which had been measured for refractive index, was polished for 6 hours by a double-side lapping machine Model 12B (Fujikoshi Machinery Corp.) using a suede-type polishing pad and cerium oxide abrasive and then for 1 hour using colloidal silica abrasive. For the substrate thus obtained, a difference between the highest and lowest positions in a central region of 142.4 mm×142.4 mm square in the substrate surface was measured using a laser interferometer. The result is reported in Table 2 as P-V flatness in exposure-accessible region.

Figure 6:
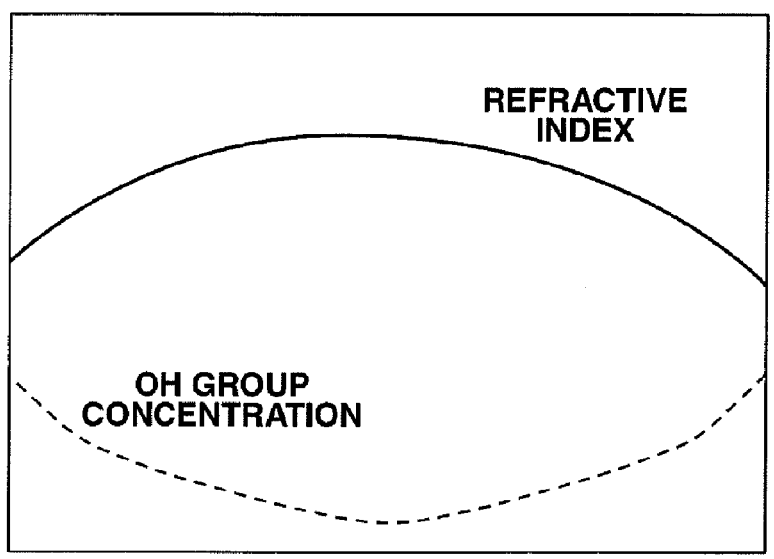
FIG. 6 illustrates an OH group concentration distribution and a refractive index distribution measured along a diagonal of the surface of the substrate of Example 3 where EUV light of up to 70 nm wavelength is reflected.

An OH group concentration distribution and a refractive index distribution, both measured along a diagonal of the substrate, are shown in FIG. 6. Evidently the refractive index distribution was in inverse correlation to the OH group concentration distribution. The difference between the maximum and minimum values of OH group concentration distribution is shown in Table 2 as OH group concentration distribution.

A hydrogen molecule concentration and a Si—H bond content were measured along a diagonal of the substrate, with the results shown in Table 2.

For titania-doped quartz glass ingot I, an average coefficient of linear thermal expansion was measured at ten points along a diagonal of the 152.4 mm×152.4 mm square surface over a temperature range of 10 to 30° C. The maximum and minimum values are shown in Table 2.

It was demonstrated that the titania-doped quartz glass member thus obtained had only one maximum point within a central region of a surface where EUV light of up to 70 nm wavelength is reflected, the refractive index distribution was in inverse correlation to the OH group concentration distribution, and the refractive index variation was satisfactorily low. Although the refractive index distribution had not central symmetry with respect to the maximum point, the photomask substrate as polished had a low P-V flatness in a central 142.4 mm×142.4 mm square region of its surface and was suited as an EUV photomask substrate.

Example 4

Figure 18:
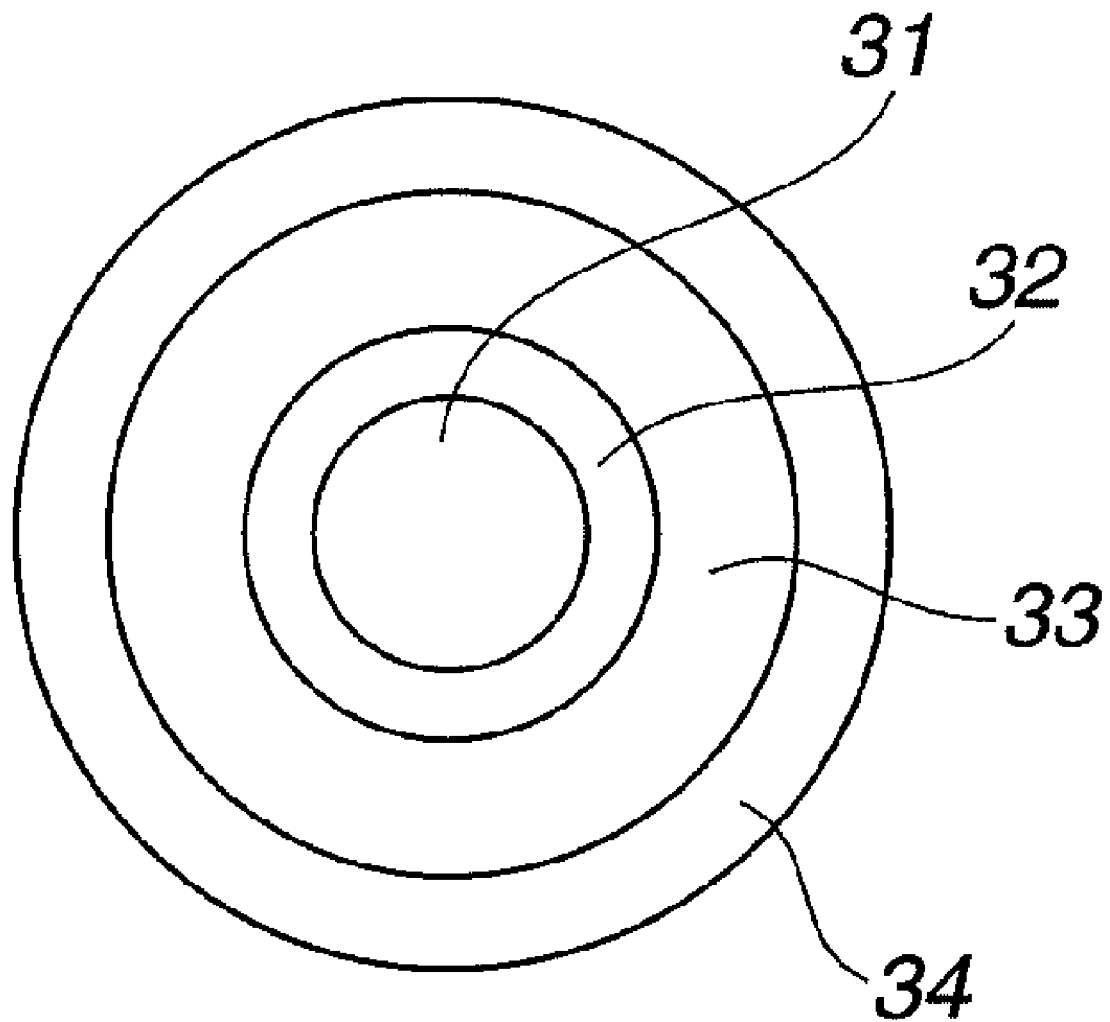
FIG. 18 is a transverse section of another burner used in Example 4.

A burner as shown in FIG. 18 was used which is described in JP-A 2001-316122. The burner in FIG. 18 includes a central or first nozzle 31 for feeding $SiCl_4$, $TiCl_4$ and $O_2$ gases, a second nozzle 32 for feeding $O_2$ gas, a third nozzle 33 for feeding $H_2$ gas, and a fourth nozzle 34 for feeding $O_2$ gas.

An ingot of titania-doped quartz glass was prepared by feeding the gases shown in Table 1 to the respective nozzles of the main burner and sub-burner, forming an oxyhydrogen flame, effecting hydrolytic reaction of silicon tetrachloride and titanium tetrachloride in the oxyhydrogen flame to produce $SiO_2$ and $TiO_2$, and depositing titania-doped silica fine particles on a target disposed forward of the burner, thus forming a titania-doped silica matrix. The target was rotated at 50 rpm and retracted at 15 mm/hr. The flow rates of different gases were kept within a variation of ±0.2%/hr. During preparation of titania-doped quartz glass in the manufacture furnace, the temperatures of air to the furnace, exhaust gas from the furnace and ambient air around the furnace were kept within a variation of ±1° C. The matrix was held at 1,130° C. under vacuum for 15 hours and heated at 1,550° C. for vitrification, obtaining a titania-doped quartz glass ingot.

Figure 7:
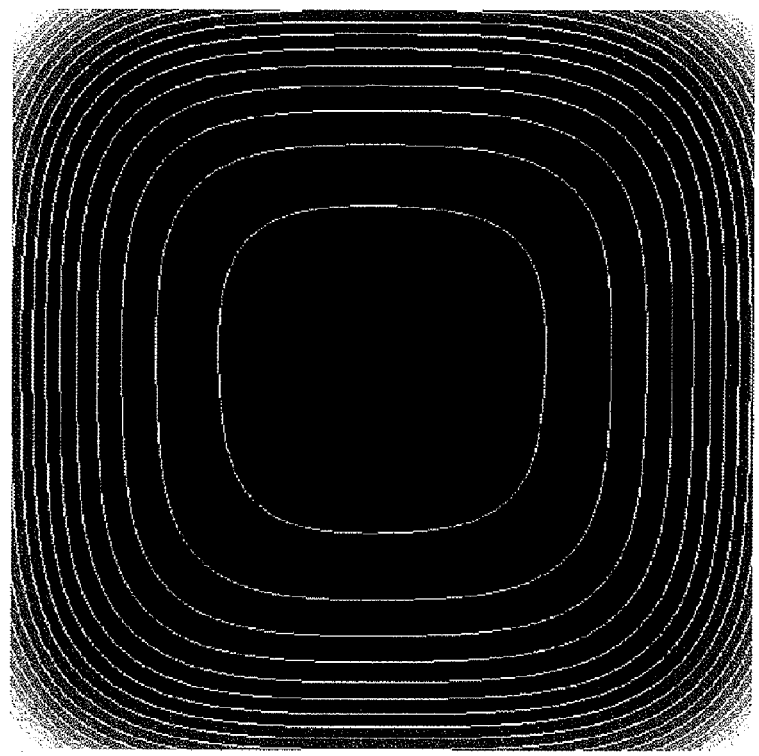
FIG. 7 illustrates a refractive index distribution in a surface of a substrate of Example 4 where EUV light of up to 70 nm wavelength is reflected.

In an electric furnace having a temperature gradient of 2.5° C./cm at 1,700° C., the resulting ingot of 120 mm diameter and 400 mm length was placed in a columnar crucible having a square bottom of 155 mm×155 mm such that the ingot was aligned with the intersection between diagonals on the square crucible bottom. The ingot was hot worked by heating at 1,700° C. for 6 hours. During hot working, the crucible was rotated at 2 rpm. The ingot was held in air at 1,150° C. for 150 hours for annealing, and then slowly cooled down to 500° C. at a rate of 5° C./hr. The ingot as annealed was machined to a square prism of 152.4 mm×152.4 mm, obtaining a titania-doped quartz glass ingot I. This ingot I was machined into a photomask substrate by slicing to a thickness of 6.7 mm. A refractive index distribution in the surface of 152.4 mm×152.4 mm square was measured. FIG. 7 shows the measured refractive index distribution whose profile had a maximum point within a central 20% region of the 152.4 mm×152.4 mm square surface. Otherwise, neither extreme point nor inflection curve was found.

A ratio of longest distance to shortest distance from the extreme point to an equi-refractive index curve of a refractive index value which differs by 1/10 from the refractive index value of the extreme point in the 152.4 mm×152.4 mm square surface was 1.42. The refractive index distribution in the 152.4 mm×152.4 mm square surface had central symmetry with respect to the maximum point. A refractive index distribution in a region where a variation of refractive index was the largest was measured to be $5.2 \times 10^{-5}/mm^2$.

The titania-doped quartz glass substrate of 152.4 mm×152.4 mm×6.7 mm thick, which had been measured for refractive index, was polished for 6 hours by a double-side lapping machine Model 12B (Fujikoshi Machinery Corp.) using a suede-type polishing pad and cerium oxide abrasive and then for 1 hour using colloidal silica abrasive. For the substrate thus obtained, a difference between the highest and lowest positions in a central region of 142.4 mm×142.4 mm square in the substrate surface was measured using a laser interferometer. The result is reported in Table 2 as P-V flatness in exposure-accessible region.

Figure 8:
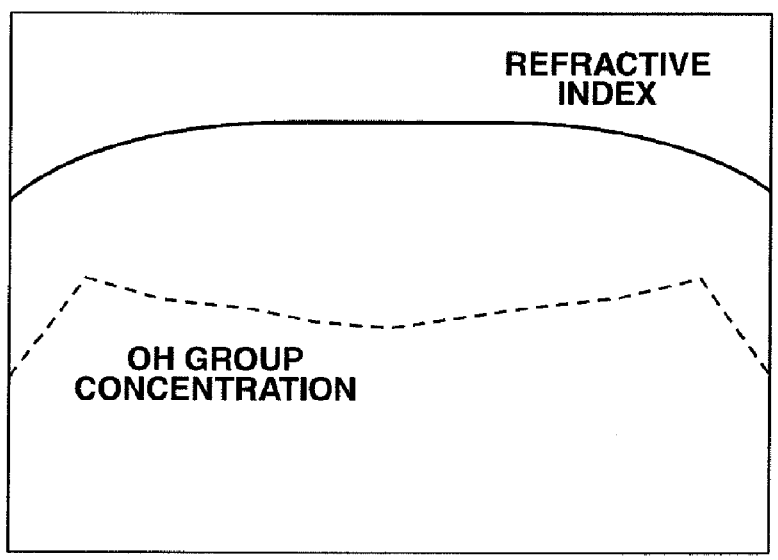
FIG. 8 illustrates an OH group concentration distribution and a refractive index distribution measured along a diagonal of the surface of the substrate of Example 4 where EUV light of up to 70 nm wavelength is reflected.

An OH group concentration distribution and a refractive index distribution, both measured along a diagonal of the substrate, are shown in FIG. 8. Evidently the refractive index distribution was in inverse correlation to the OH group concentration distribution. The difference between the maximum and minimum values of OH group concentration distribution is shown in Table 2 as OH group concentration distribution.

A hydrogen molecule concentration and a Si—H bond content were measured along a diagonal of the substrate, with the results shown in Table 2.

For titania-doped quartz glass ingot I, an average coefficient of linear thermal expansion was measured at ten points along a diagonal of the 152.4 mm×152.4 mm square surface over a temperature range of 10 to 30° C. The maximum and minimum values are shown in Table 2.

It was demonstrated that the titania-doped quartz glass member thus obtained had only one maximum point within a central region of a surface where EUV light of up to 70 nm wavelength is reflected, the refractive index distribution had central symmetry with respect to the maximum point, and the refractive index variation was satisfactorily low. Although the refractive index distribution is not in inverse correlation to the OH group concentration distribution in a peripheral portion, the photomask substrate as polished had a low P-V flatness in a central 142.4 mm×142.4 mm square region of its surface and was suited as an EUV photomask substrate.

COMPARATIVE EXAMPLE 1

An ingot of titania-doped quartz glass was prepared using the burner system shown in FIG. 17, specifically by feeding the gases as in Example 1 to the respective nozzles of the main burner and sub-burner, forming an oxyhydrogen flame, effecting hydrolytic reaction of silicon tetrachloride and titanium tetrachloride in the oxyhydrogen flame to produce $SiO_2$ and $TiO_2$, and depositing titania-doped silica fine particles on a target disposed forward of the burner. The target was rotated at 50 rpm and retracted at 10 mm/hr. The flow rates of different gases were kept within a variation of ±0.2%/hr. During preparation of titania-doped quartz glass in the manufacture furnace, the temperatures of air to the furnace, exhaust gas from the furnace and ambient air around the furnace were kept within a variation of ±1° C.

Figure 9:
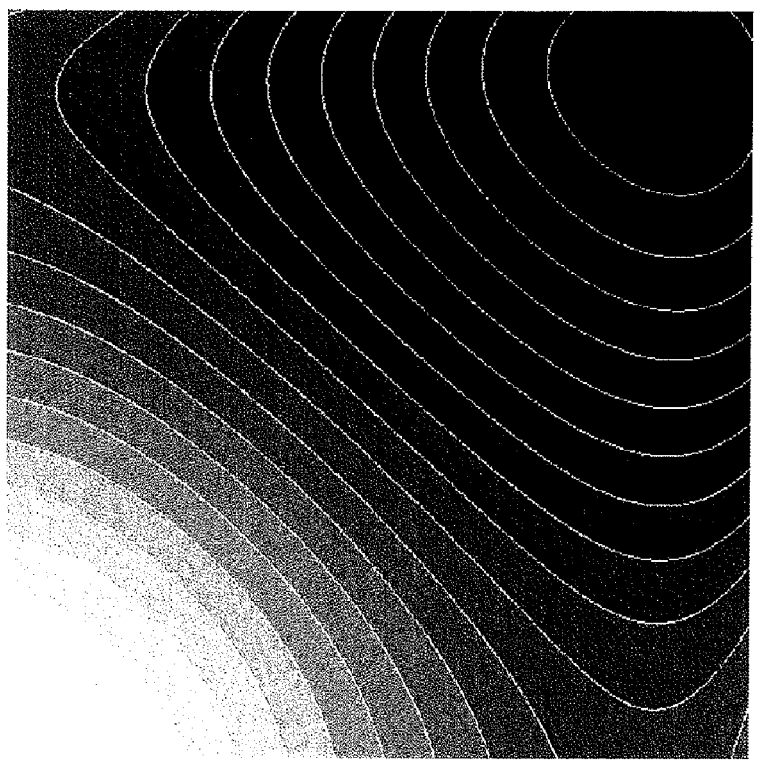
FIG. 9 illustrates a refractive index distribution in a surface of a substrate of Comparative Example 1 where EUV light of up to 70 nm wavelength is reflected.

In an electric furnace having a temperature gradient of 2.5° C./cm at 1,700° C., the resulting ingot of 120 mm diameter and 400 mm length was placed in a columnar crucible having a square bottom of 155 mm×155 mm such that the ingot was aligned with the intersection between diagonals on the square crucible bottom. The ingot was hot worked by heating at 1,700° C. for 6 hours. The ingot was held in air at 1,150° C. for 150 hours for annealing, and then slowly cooled down to 500° C. at a rate of 5° C./hr. The ingot as annealed was machined to a square prism of 152.4 mm×152.4 mm, obtaining a titania-doped quartz glass ingot I. This ingot I was machined into a photomask substrate by slicing to a thickness of 6.7 mm. A refractive index distribution in the surface of 152.4 mm×152.4 mm square was measured. FIG. 9 shows the measured refractive index distribution whose profile had a maximum point at a peripheral portion, but not within a central 80% region of the 152.4 mm×152.4 mm square surface. It was believed that the ingot leaned on the side wall of the shaping crucible during hot working. A refractive index distribution in a region where a variation of refractive index was the largest was measured to be $1.9 \times 10^{-5}/\text{mm}^2$.

The titania-doped quartz glass substrate of 152.4 mm×152.4 mm×6.7 mm thick, which had been measured for refractive index, was polished for 6 hours by a double-side lapping machine Model 12B (Fujikoshi Machinery Corp.) using a suede-type polishing pad and cerium oxide abrasive and then for 1 hour using colloidal silica abrasive. For the substrate thus obtained, a difference between the highest and lowest positions in a central region of 142.4 mm×142.4 mm square in the substrate surface was measured using a laser interferometer. The result is reported in Table 2 as P-V flatness in exposure-accessible region.

Figure 10:
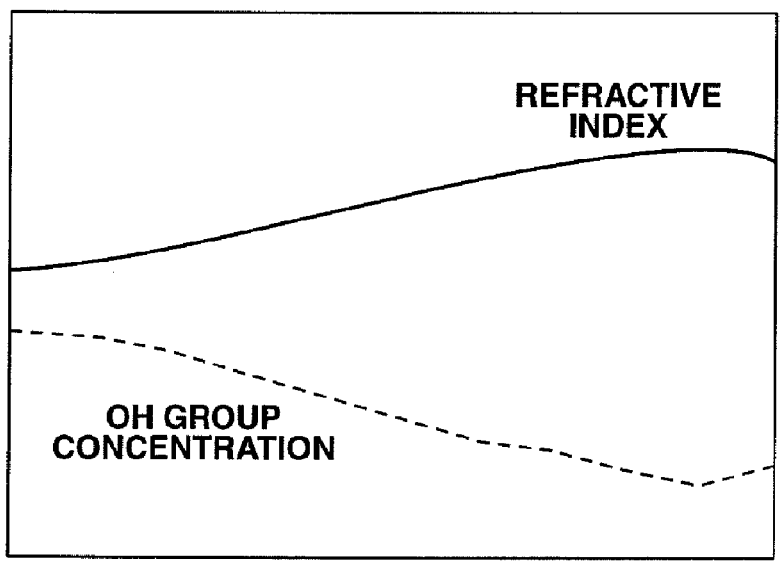
FIG. 10 illustrates an OH group concentration distribution and a refractive index distribution measured along a diagonal of the surface of the substrate of Comparative Example 1 where EUV light of up to 70 nm wavelength is reflected.

An OH group concentration distribution and a refractive index distribution, both measured along a diagonal of the substrate, are shown in FIG. 10. Evidently the refractive index distribution was in inverse correlation to the OH group concentration distribution. The difference between the maximum and minimum values of OH group concentration distribution is shown in Table 2 as OH group concentration distribution.

A hydrogen molecule concentration and a Si—H bond content were measured along a diagonal of the substrate, with the results shown in Table 2.

For titania-doped quartz glass ingot I, an average coefficient of linear thermal expansion was measured at ten points along a diagonal of the 152.4 mm×152.4 mm square surface over a temperature range of 10 to 30° C. The maximum and minimum values are shown in Table 2.

The titania-doped quartz glass member thus obtained had a poor P-V flatness in a central 142.4 mm×142.4 mm square region of its surface and was unsuitable as an EUV photomask substrate.

COMPARATIVE EXAMPLE 2

An ingot of titania-doped quartz glass was prepared using the burner system shown in FIG. 17, specifically by feeding the gases as in Example 1 to the respective nozzles of the main burner and sub-burner, forming an oxyhydrogen flame, effecting hydrolytic reaction of silicon tetrachloride and titanium tetrachloride in the oxyhydrogen flame to produce $SiO_2$ and $TiO_2$, and depositing titania-doped silica fine particles on a target disposed forward of the burner. The target was rotated at 50 rpm and retracted at 12 mm/hr. The flow rates of different gases were kept within a variation of ±0.2%/hr. During preparation of titania-doped quartz glass in the manufacture furnace, the temperatures of air to the furnace, exhaust gas from the furnace and ambient air around the furnace were kept within a variation of ±1° C.

Figure 11:
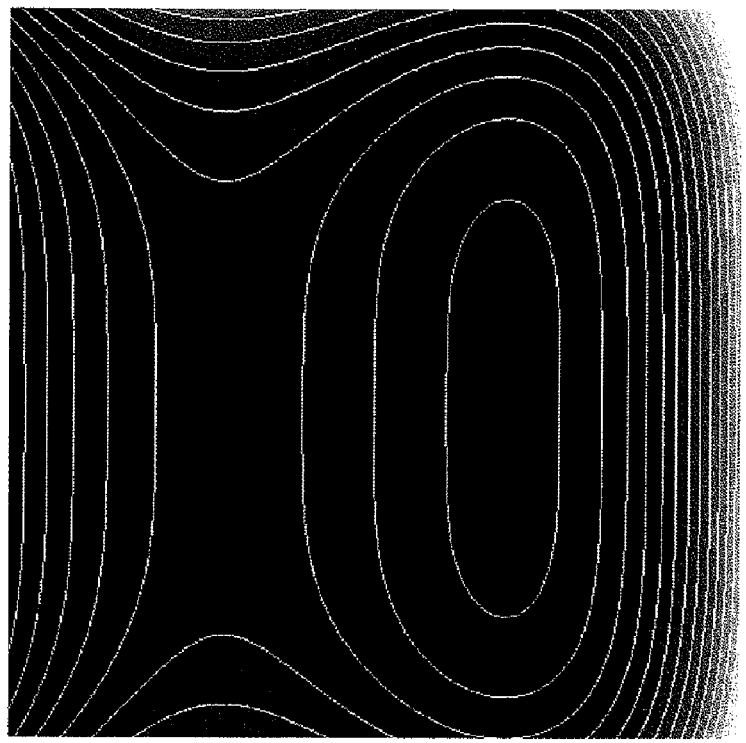
FIG. 11 illustrates a refractive index distribution in a surface of a substrate of Comparative Example 2 where EUV light of up to 70 nm wavelength is reflected.

In an electric furnace having a temperature gradient of 1.2° C./cm at 1,700° C., the resulting ingot of 100 mm diameter and 400 mm length was placed in a columnar crucible having a square bottom of 155 mm×155 mm such that the ingot was aligned with the intersection between diagonals on the square crucible bottom. The ingot was hot worked by heating at 1,700° C. for 6 hours. The ingot was held in air at 1,150° C. for 150 hours for annealing, and then slowly cooled down to 500° C. at a rate of 5° C./hr. The ingot as annealed was machined to a square prism of 152.4 mm×152.4 mm, obtaining a titania-doped quartz glass ingot I. This ingot I was machined into a photomask substrate by slicing to a thickness of 6.7 mm. A refractive index distribution in the surface of 152.4 mm×152.4 mm square was measured. FIG. 11 shows the measured refractive index distribution whose profile had maximum and minimum points of refractive index. The difference in refractive index between these points was $3.28 \times 10^{-4}$. It was believed that the ingot buckled during hot working. A refractive index distribution in a region where a variation of refractive index was the largest was measured to be $7.7 \times 10^{-5}/\text{mm}^2$.

The titania-doped quartz glass substrate of 152.4 mm×152.4 mm×6.7 mm thick, which had been measured for refractive index, was polished for 6 hours by a double-side lapping machine Model 12B (Fujikoshi Machinery Corp.) using a suede-type polishing pad and cerium oxide abrasive and then for 1 hour using colloidal silica abrasive. For the substrate thus obtained, a difference between the highest and lowest positions in a central region of 142.4 mm×142.4 mm square in the substrate surface was measured using a laser interferometer. The result is reported in Table 2 as P-V flatness in exposure-accessible region.

Figure 12:
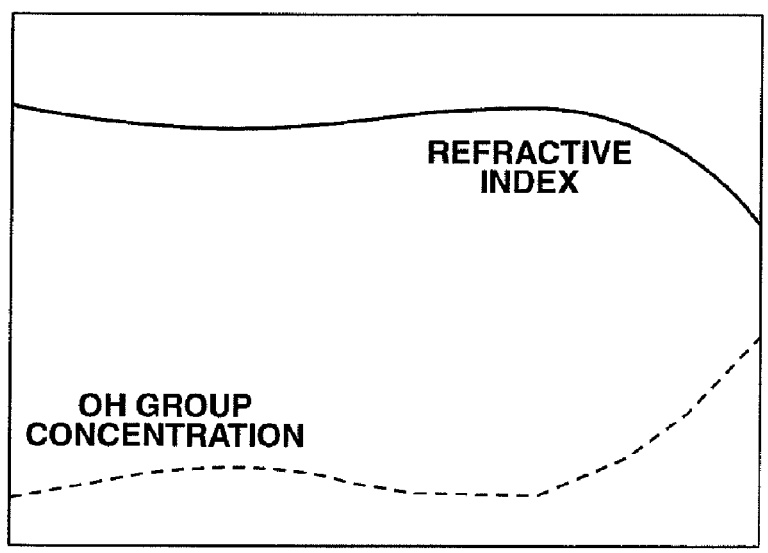
FIG. 12 illustrates an OH group concentration distribution and a refractive index distribution measured along a diagonal of the surface of the substrate of Comparative Example 2 where EUV light of up to 70 nm wavelength is reflected.

An OH group concentration distribution and a refractive index distribution, both measured along a diagonal of the substrate, are shown in FIG. 12. The refractive index distribution was in inverse correlation to the OH group concentration distribution. The difference between the maximum and minimum values of OH group concentration distribution is shown in Table 2 as OH group concentration distribution.

A hydrogen molecule concentration and a Si—H bond content were measured along a diagonal of the substrate, with the results shown in Table 2.

For titania-doped quartz glass ingot I, an average coefficient of linear thermal expansion was measured at ten points along a diagonal of the 152.4 mm×152.4 mm square surface over a temperature range of 10 to 30° C. The maximum and minimum values are shown in Table 2.

The titania-doped quartz glass member thus obtained had a poor P-V flatness in a central 142.4 mm×142.4 mm square region of its surface and was unsuitable as an EUV photomask substrate.

TABLE 1

| Gas flow rate (Nm³/hr) | | Example 1 | Example 2 | Example 4 |
|---|---|---|---|---|
| Main burner | | | | |
| 1 | $SiCl_4$ | 1,250 g/hr | 1,250 g/hr | 1,250 g/hr |
|   | $TiCl_4$ | 150 g/hr | 150 g/hr | 100 g/hr |
|   | $O_2$ | 2 | 2 | 2 |
| 2 | $O_2$ | 1 | 1 | 1 |
| 3 | $H_2$ | 15 | 10 | 12 |
| 4 | $O_2$ | 8 | 7 | 4.5 |
| 5 | $H_2$ | 10 | 10 | — |
| 6 | $O_2$ | 10 | 10 | — |
| 7 | $H_2$ | 20 | 20 | — |
| Sub-burner | | | | |
| 1 | $H_2$ | 10 | — | 4.5 |
| 2 | $O_2$ | 4 | — | 3 |

TABLE 2

| | | Average coefficient of linear thermal expansion (ppb/° C.) | | Refractive index distribution | OH group concentration distribution (ppm) | Hydrogen molecule concentration (molecules/cm³) | Si—H bond content (bonds/cm³) | P—V flatness (nm) | Surface roughness (nm) |
|---|---|---|---|---|---|---|---|---|---|
| | | Maximum | Minimum | | | | | | |
| Example | 1 | 5 | −7 | $4.4 \times 10^{-4}$ | 35 | $5 \times 10^{17}$ | $5 \times 10^{16}$ | 65 | 0.15 |
| | 2 | 10 | −4 | $5.3 \times 10^{-4}$ | 42 | $3 \times 10^{17}$ | $3 \times 10^{16}$ | 59 | 0.13 |
| | 3 | 19 | −12 | $12.0 \times 10^{-4}$ | 86 | $5 \times 10^{17}$ | $5 \times 10^{16}$ | 112 | 0.13 |
| | 4 | 7 | −11 | $6.7 \times 10^{-4}$ | 58 | N.D. | N.D. | 90 | 0.14 |
| Comparative Example | 1 | 20 | −12 | $12.0 \times 10^{-4}$ | 84 | $5 \times 10^{17}$ | $5 \times 10^{16}$ | 282 | 0.16 |
| | 2 | 15 | −5 | $9.8 \times 10^{-4}$ | 93 | $5 \times 10^{17}$ | $5 \times 10^{16}$ | 365 | 0.18 |

Japanese Patent Application No. 2008-177076 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for preparing a titania-doped quartz glass member, comprising the steps of:
subjecting a silicon source gas feed and a titanium source gas feed to flame hydrolysis with the aid of a combustible gas and a combustion-supporting gas, to form synthetic silica fine particles;
depositing the silica fine particles on a rotating target, and concurrently melting and vitrifying the particles to form quartz glass, thereby forming a titania-doped quartz glass ingot;
placing the ingot in a shaping crucible which rotates in a furnace whose temperature distribution has a temperature gradient of at least 1.5° C./cm at 1,700° C.;
shaping the titania-doped quartz glass in the crucible at 1,500 to 1,800° C. for 1 to 10 hours;
holding the ingot at 700 to 1,300° C. in air for 1 to 200 hours for annealing; and
slowly cooling the ingot down to 500° C. at a rate of 1 to 20° C./hr.

2. The method of claim 1 wherein
the target is rotated at a rotational speed of at least 5 rpm, and flow rates of the silicon source gas feed, titanium source gas feed, combustible gas, and combustion-supporting gas are controlled within a variation of ±1%/hr.

3. The method of claim 1 wherein the shaping crucible rotates at a rotational speed of at least 0.1 rpm.

4. The method of claim 1 wherein the shaping crucible rotates at a rotational speed of 0.1 to 10 rpm.

5. The method of claim 1 wherein the shaping crucible rotates at a rotational speed of 0.5 to 5 rpm.

6. The method of claim 1 wherein the shaping crucible rotates at a rotational speed of 1 to 3 rpm.

7. The method of claim 1, wherein the temperature gradient is 1.5 to 10.0° C./cm at 1,700° C.

* * * * *